United States Patent [19]

Osaka et al.

[11] Patent Number: 5,057,360

[45] Date of Patent: Oct. 15, 1991

[54] CERAMIC GREEN SHEET

[75] Inventors: Shigemi Osaka; Kazuo Hata; Norikazu Aikawa, all of Himeji; Masato Adachi, Takatsuki, all of Japan

[73] Assignee: Nippon Shokubai Kagaku Kogyo Co., Ltd., Osaka, Japan

[21] Appl. No.: 261,620

[22] Filed: Oct. 24, 1988

[30] Foreign Application Priority Data

Oct. 23, 1987 [JP]  Japan .................. 62-266497

[51] Int. Cl.$^5$ ............................ B32B 5/16
[52] U.S. Cl. ............................ 428/220; 428/323; 428/324; 428/500; 428/523; 428/901; 501/103; 501/153; 524/413; 524/444; 524/560
[58] Field of Search ............ 524/413, 444, 560; 428/323, 328, 329, 407, 338, 339, 500, 523, 901, 324, 220; 501/153, 103

[56] References Cited

U.S. PATENT DOCUMENTS

| | | | |
|---|---|---|---|
| 3,991,029 | 11/1976 | Adelman | 524/413 |
| 4,289,823 | 8/1981 | Aikens | 428/407 |
| 4,480,045 | 10/1984 | Gougougan et al. | 501/153 |
| 4,520,114 | 5/1985 | David | 501/12 |
| 4,536,535 | 8/1985 | Usala | 524/413 |
| 4,543,341 | 9/1985 | Barringer et al. | 501/135 |
| 4,613,648 | 9/1986 | Usala | 524/560 |
| 4,664,894 | 5/1987 | Suzuki et al. | 423/265 |

FOREIGN PATENT DOCUMENTS

| | | |
|---|---|---|
| 0237273 | 9/1987 | European Pat. Off. . |
| 3248391 | 6/1984 | Fed. Rep. of Germany . |
| 60-176921 | 9/1985 | Japan . |
| 62-153121 | 7/1987 | Japan . |
| 62-212225 | 9/1987 | Japan . |
| 63-176308 | 7/1988 | Japan . |

Primary Examiner—Ellis P. Robinson
Assistant Examiner—Archene A. Turner
Attorney, Agent, or Firm—Burns, Doane, Swecker & Mathis

[57] ABSTRACT

The present invention discloses a ceramic precursor composition, comprising (A) 100 parts by weight of at least one fine ceramic powder selected from the group consisting of zirconia and alumina and having an average particle diameter in the range of 0.01 to 2 microns and (B) 10 to 40 parts by weight of a copolymer produced by copolymerizing (a) 10 to 50% by weight of an alkyl or cycloalkyl acrylate having an alkyl group of 1 to 10 carbon atoms or a cycloalkyl group of 4 to 8 carbon atoms, (b) 30 to 80% by weight of an alkyl or cycloalkyl methacrylate having an alkyl group of 1 to 20 carbon atoms or a cycloalkyl group of 4 to 8 carbon atoms, (c) 1 to 5% by weight of a copolymerizable unsaturated carboxylic acid, and (d) 0 to 59% by weight of a hydroxyalkyl acrylate having a hydroxyalkyl group of 2 to 10 carbon atoms (providing that the total amount of the monomers is 100% by weight) and having a number average molecular weight in the range of 10,000 to 100,000 and a glass transition point in the range of $-40°$ to $0°$ C., a ceramic green sheet made of such ceramic precursor composition, a method for the production of such ceramic green sheet, and a ceramic sheet produced by calcining such ceramic green sheet.

14 Claims, No Drawings

CERAMIC GREEN SHEET

BACKGROUND OF THE INVENTION

1. Field of the Invention

This invention relates to a ceramic precursor composition, a ceramic green sheet, a method for the production thereof, a ceramic sheet, and use thereof. More particularly, it relates to a zirconia or alumina ceramic precursor composition, the ceramic green sheet, a method for the production thereof, and use of the ceramic sheet.

2. Description of the Prior Art

The doctor blade method is a method for producing a ceramic green sheet by mixing a ceramic powder with an organic solvent, a dispersant, a plasticizer, a binder, etc. thereby preparing a slurry, casting the slurry in a regulated thickness on a carrier film with the aid of a doctor blade, and drying the applied layer of the slurry. This method has been commercialized by regulating the ceramic powder as the raw material in particle diameter and particle diameter distribution and using a butyral type resin like polyvinyl butyral, a cellulose type resin like ethyl cellulose, or polyvinyl alcohol as the binder.

When this conventional binder is used, however, since the formed green sheet is deficient in flexibility, it has the possibility of sustaining a fracture or a crack while it is being dried or punched or otherwise handled under an impact. The method, therefore, has no alternative but to use such a plasticizer as a phthalic ester and inevitably has a disadvantage that while the formed green sheet is kept in storage, the plasticizer eventually exudes to and volatilizes from the surface of the green sheet and leaves the green sheet in an embrittled state. The binder has poor thermal decomposability. The ashes such as carbon and Na which remain after the green sheet is purged of the binder possibly cause deformation of the green sheet as with blistering, crazing, and cracking during the course of calcination. When the green sheet is used as electronic parts such as IC substrates, IC packages, and dielectrics, the deformation impairs the electric insulating property and other electric properties of the electronic parts. Further, the ashes form a cause for rough surface and low sintering density. Particularly in the production of a thin sheet contemplated by the present invention, the ceramic powder as the raw material is desired to comprise submicrons not exceeding 1 micron in diameter. When the conventional binder is used, it tends to induce aggregation of such ceramic submicrons. For the formation of the sheet, the binder must be used in a large amount. All these adverse factors aggravate the deficiency in formability of the green sheet.

An object of this invention, therefore, is to provide a novel ceramic precursor composition, the ceramic green sheet, a method for the production thereof, a ceramic sheet, and use thereof.

Another object of this invention is to provide a zirconia or alumina ceramic precursor composition, the ceramic green sheet, a method for the production thereof, the ceramic sheet, and use thereof.

Yet another object of this invention is to provide a ceramic precursor composition capable of forming a green sheet possessing sufficient mechanical strength and flexibility, excelling in surface smoothness, and having a uniform thickness of not more than 0.5 mm, preferably not more than 100 microns, a ceramic green sheet formed of the composition, a method for the production of the ceramic green sheet, a ceramic sheet obtained by calcining the ceramic green sheet, and use of the ceramic sheet.

SUMMARY OF THE INVENTION

The objects described above are accomplished by a ceramic precursor composition, comprising (A) 100 parts by weight of at least one fine ceramic powder selected from the group consisting of zirconia and alumina and having an average particle diameter in the range of 0.01 to 2 microns and (B) 10 to 40 parts by weight of a copolymer produced by copolymerizing (a) 10 to 50% by weight of an alkyl or cycloalkyl acrylate having an alkyl group of 1 to 10 carbon atoms or a cycloalkyl group of 4 to 8 carbon atoms, (b) 30 to 80% by weight of an alkyl or cycloalkyl methacrylate having an alkyl group of 1 to 20 carbon atoms or a cycloalkyl group of 4 to 8 carbon atoms, (c) 1 to 5% by weight of a copolymerizable unsaturated carboxylic acid, and (d) 0 to 59% by weight of a hydroxyalkyl acrylate having a hydroxyalkyl group of 2 to 10 carbon atoms (providing that the total amount of the monomers is 100% by weight) and having a number average molecular weight in the range of 10,000 to 100,000 and a glass transition point in the range of $-40°$ to $0°$ C.

The objects described above are accomplished by a ceramic green sheet made of a sheet of a ceramic precursor composition, comprising (A) 100 parts by weight of at least one fine ceramic powder selected from the group consisting of zirconia and alumina and having an average particle diameter in the range of 0.01 to 2 microns and (B) 10 to 40 parts by weight of a copolymer produced by copolymerizing (a) 10 to 50% by weight of an alkyl or cycloalkyl acrylate having an alkyl group of 1 to 10 carbon atoms or a cycloalkyl group of 4 to 8 carbon atoms, (b) 30 to 80% by weight of an alkyl or cycloalkyl methacrylate having an alkyl group of 1 to 20 carbon atoms or a cycloalkyl group of 4 to 8 carbon atoms, (c) 1 to 5% by weight of a copolymerizable unsaturated carboxylic acid, and (d) 0 to 59% by weight of a hydroxyalkyl acrylate having a hydroxyalkyl group of 2 to 10 carbon atoms (providing that the total amount of the monomers is 100% by weight) and having a number average molecular weight in the range of 10,000 to 100,000 and a glass transition point in the range of $-40°$ to $0°$ C.

The objects described above are accomplished by a method for the production of a ceramic green sheet, which comprises coating the surface of a substrate with a thin layer of a ceramic precursor composition slurry containing (A) 100 parts by weight of at least one fine ceramic powder selected from the group consisting of zirconia and alumina and having an average particle diameter in the range of 0.01 to 2 microns and (B) 10 to 40 parts by weight of the copolymer mentioned above.

The objects described above are accomplished by a ceramic sheet which is produced by calcining the ceramic green sheet mentioned above.

In accordance with the present invention, there is obtained a green sheet which exhibits satisfactory mechanical strength and flexibility, excels in surface smoothness, and possesses a uniform thickness of not more than 1 mm, preferably not more than 0.5 mm, preferably not more than 100 microns. By calcining this green sheet, there is obtained a ceramic sheet which measures not more than 0.8 mm, desirably not more than 0.4 mm, and particularly not more than 100 microns, possesses a compact texture, and excels in surface smoothness. Since the ceramic sheet produced by the present invention excels in various properties such as heat resistance, mechanical strength, electrical insulating property, and chemical durability, it can be used as substrates for various types of electronic circuits and substrates for films deposited by vacuum evaporation and spattering in the field of electronic materials and as thermal insulating materials, corrosionproof materials, insulating materials, and sliding materials in the field of mechanical materials.

In the field of electronic materials, the trend of electronic machines and devices toward reduction in size and improvement in performance has been urging development of circuit elements in the form of film. By the same token, the substrates for such circuit elements are required to undergo transformation into films. Also the development of mechanical materials harnessing such novel properties as flexibility and light transmitting property which are manifested by ceramic sheets of decreased thickness has been craved. The ceramic sheet contemplated by the present invention can satisfy all these requirements. In the case of sensors and solid electrolyte fuel cells which make use of the ability of zirconia to conduct oxygen ion, there has arisen a need for thin sheets of zirconia to conduct oxygen ion, there has arisen a need for thin sheets of zirconia which show no capacity for gas permeation and permit reduction in resistance/of the solid electrolyte. This requirement is also fulfilled completely by the ceramic sheet of the present invention.

EXPLANATION OF THE PREFERRED EMBODIMENT

For the present invention, the choice of a fine ceramic powder to be used and the selection of a binder most suitable therefor are very important factors. At least one species of fine ceramic powder to be selected from the group consisting of zirconia and alumina is desired to be weakly cohesive and highly pure zirconia and/or alumina composed of submicrons having an average particle diameter in the range of 0.01 to 2 microns, preferably 0.03 to 1 micron. For the purpose of precluding the sintered sheet from developing such defects as warps, strains, and cracks owing to the local difference and anisotropy of the shrinkage during the course of sintering and also improving the dimentional stability, the individual particles of the ceramic powder as the raw material are desired to be uniform in particle diameter and, what is more, to have a homaxially spherical shape.

The fine powder produced by any of a series of methods developed by us for production of fine ceramic powders fulfils the requirements described above. It has been established to constitute itself a satisfactory raw material for the ceramic sheet contemplated by this invention. This invention has been perfected as a result. To cite typical examples of the method for the production of such fine ceramic powder, JP-A-61-44,717 discloses a method for the production of a fine zirconia powder by preparing an aqueous solution or suspension of zirconyl-ammonium carbonate or a mixture thereof with a compound of at least one metal selected from the group consisting of yttrium, calcium, and magnesium, treating the aqueous solution or suspension with hydrogen peroxide or ozone thereby giving rise to a solid precipitate, separating the solid precipitate, and drying the separated solid precipitate, U.S. Pat. No. 4,664,894 discloses a method for the production of micronized zirconia by the addition of an alkali to an aqueous solution of a zirconium salt or to a mixed aqueous solution of the zirconium salt and a compound of at least one metal selected from the group consisting of yttrium, calcium, and magnesium, which method comprises carrying out the reaction for formation of a hydroxide by the addition of the alkali continuously in a flow type reaction system while keeping the pH of the reaction system adjusted accurately within ±0.5 of the fixed level in the range of 6.0 to 13.0, separating the hydroxide produced consequently by the reaction, washing with water to remove the alkali salt followed by dehydrating and drying with an organic solvent and subsequently spray drying and calcining the separated hydroxide; JP-A-62-153,121 discloses a method for the production of a fine zirconia powder by adding to an aqueous solution of zirconium ammonium carbonate an aqueous solution prepared by the addition of hydrogen peroxide to an aqueous solution of a calcium salt and/or a magnesium salt thereby giving rise to a solid substance, separating the solid substance from the mother liquid, and drying and calcining the separated substance; JP-A-63-176,308 discloses a method for the production of surface-treated zirconia type particles by mixing or suspending zirconia or a zirconia type powder containing not more than 50 mol% of the oxide of at least one element selected from the group consisting of yttrium, cerium, calcium, and magnesium with or in a coupling agent and a solvent, then optionally disprsing the zirconia powder in an organic solvent, thermally distilling the resultant mixture or suspension, dehydrating the residue of the distillation, drying the dehydratred residue, and subsequently heat-treating the dry residue at a temperature in the range of 20° to 300° C; JP-A-60-176,921 discloses a method for the production of a fine zirconia particle comprising cousing ammonium zirconyl carbonate to the hydrolysis in an aqueous solution in the presence of an organic compound, separating, drying and calcining the portion of solid phase, being a decomposition product; and JP-A-62-212,225 discloses a method for the production of a fine zirconia-containing powder by mixing an aqueous solution of a zirconium salt or a mixture of a zirconium salt and the salt of at least one metal selected from among yttrium, calcium, and magnesium with a basic substance thereby giving rise to hydroxide precipitate, washing with water and filtering the precipitate, dispersing the separated precipitate in an organic solvent, thermally distilling the resultant dispersion for dehydration then drying the dehydrated residue of the distillation under application of pressure, and subsequently calcining the dry solid substance. Among other methods cited above, the method disclosed in U.S. Pat. No. 4,664,894 is capable of producing a particularly desirable fine powder of zirconia.

The fine alumina powder which is produced by a method equaling the method for production of zirconia disclosed by U.S. Pat. No. 4,664,894 also satisfies the requirements imposed on the fine ceramic powder to be used in the present invention. U.S. Ser. No. 159,889 discloses a method for the production of very small spherical inorganic particles by causing at least one metal oxide-containing sol selected from the group consisting of (a) metal oxide sols and (b) mixed sols obtained by mixing the metal oxide sols mentioned above with an inorganic compound, an alkoxide, or a sol of at least one other element to be mixed with an organic solvent either insoluble or springly soluble in water in the presence of a surfactant thereby forming a W/O type sol emulsion, mixing the emulsion with a basic substance or an electrolytic substance thereby geling the sol constituting the water phase of the emulsion and consequently giving rise to spherical gels, and subsequently heating the sperical gels thereby expelling the water from the spherical gels and allowing the expelled water to be removed from system as mixed with the organic solvent. The minute spherical zirconia particles or alumina particles obtained by this method can be homogeneously mixed with a binder of the kind contemplated by this invention without entailing the phenomenon of aggregation. They have been established to possess an improved capacity for formation of a sheet. Thus, they are used particularly desirably in the present invention.

The minute spherical zirconia and alumina particles produced by the method mentioned above are desired to have particle diameter whose standard deviation is in the range of 1 to 1.5, preferably 1 to 1.3.

The binder to be used in the present invention is a copolymer which is obtained by copolymerizing a monomer mixture comprising (a), (b), and (c) and optionally (d). It has a number average molecular weight in the range of 10,000 to 100,000, preferably 30,000 to 75,000 and a glass transition point in the range of $-40°$ to $0°$ C.

The monomer (a) is an alkyl acrylate or a cycloalkyl acrylate having an alkyl group of 1 to 10 carbon atoms, preferably 2 to 8 carbon atoms, or a cycloalkyl group of 4 to 8 carbon atoms, preferably 5 to 6 carbon atoms. The alkyl acrylate is preferred over the cycloalkyl acrylate. Optionally, a mixture of two or more such acrylates may be used as occasion demands. The acrylates answering the description include methyl acrylate, ethyl acrylate, isopropyl acrylate, n-propyl acrylate, n-butyl acrylate, isobutyl acrylate, 2-ethylhexyl acrylate, lauryl acrylate, cyclohexyl acrylate, and cycloheptyl acrylate, for example. Among other acrylates mentioned above, n-butyl acrylate and 2-ethylhexyl acrylate are usable particularly advantageously. The amount of the acrylate to be used is in the range of 10 to 50% by weight, preferably 20 to 40 % by weight, based on 100% by weight of the total amount of all the monomers participating in the copolymerization. If this amount is less than 10% by weight, the produced binder is deficient in binding force and the green sheet using the binder is deficient in flexibility and apt to sustain cracks and suffer from inferior formability into a ceramic sheet. Conversely, if this amount exceeds 50% by weight, the green sheet is deficient in thermal decomposability and liable to sustain cracks during the course of calcination.

The monomer (b) is an alkyl methacrylate or a cycloalkyl methacrylate having an alkyl group of 1 to 20 carbon atoms, preferably 2 to 8 carbon atoms, or a cycloalkyl group having 4 to 8 carbon atoms, preferably 5 to 6 carbon atoms. These acrylates are used either singly or in the form of a mixture of two or more members. The methacrylates answering the description include methyl methacrylate, ethyl methacrylate, isopropyl methacrylate, n-propyl methacrylate, n-butyl methacrylate, isobutyl methacrylate, sec-butyl methacrylate, t-butyl methacrylate, 2-ethylhexyl methacrylate, n-dodecyl methacrylate, lauryl methacrylate, stearyl methacrylate, cyclohexyl methacrylate, and cycloheptyl methacrylate, for example. Among other methacrylates mentioned above, butyl methacrylate, 2-ethylhexyl methacrylates, and cyclohexyl methacrylate are usable particularly desirably. The amount of the methacrylate to be used is in the range of 30 to 80% by weight, preferably 50 to 75% by weight, based on 100% by weight of the total amount of all the monomers participating in the copolymerization. If this amount is less than 30% by weight, the binder is deficient in thermal decomposability and the green sheet is deficient in strength. Conversely, if this amount exceeds 80% by weight, the green sheet is deficient in flexibility, abundant in rigidity, liable to sustain cracks, and deficient in sheet forming property.

The monomer (c) is a copolymerizable unsaturated carboxylic acid, optionally, a mixture of two or more such carboxylic acids may be used. The copolymerizable unsaturated carboxylic acids, answering this description include acrylic acid, methacrylic acid, maleic acid, itaconic acid, and citraconic acid, for example. Such unsaturated monomers as monoisopropyl maleate and other maleates which have at least one carboxyl group in the molecular unit thereof are also usable. Among other copolymerizable unsaturated carboxylic acids mentioned above, acrylic acid and methacrylic acid are usable particularly advantageously. The amount of the copolymerizable unsaturated carboxylic acid to be used is in the range of 1 to 5% by weight, preferably 1 to 3% by weight, based on 100% by weight of the total amount of all the monomers participating in the copolymerization. If this amount is less than 1% by weight, the produced binder does not sufficiently wet or adhere to the fine zirconia or alumina powder and betrays deficient in binding force and the green sheet using this binder is deficient in strength. If this amount exceeds 5% by weight, the green sheet gains unduly in rigidity and fails to offer necessary flexibility.

The monomer (d) is a hydroxyalkyl acrylate having a hydroxyalkyl group of 2 to 10 carbon atoms, preferably 2 to 4 carbon atoms. Optionally, a mixture of two or more such hydroxyalkyl acrylates may be used as occasion demands. The hydroxyalkyl acrylates answering this description include 2-hydroxyethyl acrylate, 2-hydroxypropyl acrylate, 3-hydroxypropyl acrylate, 2-hydroxybutyl acrylate, glycerol monoacrylate, and trimethylol propane monoacrylate, for example. Among other hydroxyalkyl acrylates mentioned above, 2-hydroxyethyl acrylate is usable particularly advantageously. This hydroxyalkyl acrylate is optionally used as for the purpose of adjusting the glass transition point of the copolymer intended as the binder. The ratio thereof to the total amount of all the monomers percipitating in the copolymerization is in the range of 0 to 59% by weight. If the ratio exceeds 59% by weight the ratios of the essential copolymerizable monomers fall short of their respective lower limits. Thus, the various drawbacks mentioned above will be entailed.

The method of polymerization to be employed for the production of the copolymer (B) from the monomers described above is not critical. The copolymerization is carried out by the conventional method such as suspension polymerization, solution polymerization, or emulsion polymerization at a temperature in the range of 50° % to 100° C. preferably 70° to 90° C. in the presence of a radical polymerization initiator such as, for example, a peroxide, a hydroperoxide, or azobisisobutyronitrile. The copolymerization is regulated so that the produced copolymer acquire a number average molecular weight in the range of 10,000 to 100,000, preferably 30,000 to 75,000. If the molecular weight is less than 10,000 the binder is deficient in binding force and the green sheet using the binder is deficient in strength and moldability.

To overcome the deficiency, the green sheet requires use of the binder in an unduly large amount. Conversely, if the molecular weight exceeds 100,000, the binder is so as high as to necessitate addition to the amount of the solvent to be used for dilution thereof and consequently degrade the moldability of the green sheet.

The mixing ratio of the component monomers mentioned above is to be optimally selected so that the produced copolymer will acquire a glass transition point in the range of $-40°$ to $0°$ C., preferably $-30°$ to $-10°$ C. If the glass transition point is lower than $-40°$ C., the green sheet has too high viscosity to enjoy sufficient ease of handling. If the glass transition point is higher than $0°$ C., the produced copolymer grows in rigidity, loses in sheet-forming property, necessitates addition to the large amount of the plasticizer, and suffers from impairment of the thermal decomposability.

The amount of the binder to be added is in the range of 10 to 40 parts by weight, based on 100 parts by weight of the fine zirconia and/or alumina powder. This amount of addition is generally governed by the particle diameter of the fine powder. Desirably, the amount is in the range of 15 to 40 parts by weight where the particle diameter is in the range of 0.01 to 1 micron or in the range of 10 to 30 parts by weight where the particle diameter is in the range of 1 to 2 microns. If the amount of the binder to be added is less than 10 parts by weight, the produced ceramic precursor composition is deficient in moldability into green sheet, strength, and flexibility. Conversely, if this amount exceeds 40 parts by weight, the green sheet betrays poor fabricability, succumbs to heavy shrinkage after the calcination, and fails to acquire dimensional stability.

The slurry for casting is obtained by blending the fine powder of zirconia and/or alumina with the solvent and the binder, by the conventional method using a ball mill, for example. Optionally, a sintering auxiliary, a dispersant, a plasticizer, and a defoaming agent may be added to the ball mill.

The solvents which are usable for the preparation of the slurry are organic solvents such as acetone, methylethyl ketone, methanol, ethanol, isopropanol, butanols, modified alcohols, ethyl acetate, toluene, and xylene, for example. They are used either singly or in the form of a mixture of two or more members.

The dispersants available for the preparation of the slurry include polyhydric alcohols ester type polyethers (polyols) such as glycerol and sorbitan, and amines, for example. Among other dispersants mentioned above, sorbitan triol is used particularly advantageously.

The plasticizers usable for the preparation of the slurry include derivatives of polyethylene glycol and phthalic ester. Among other plasticizers mentioned above, dibutyl phthalate and dioctyl phthalate are used particularly advantageously.

The slurry having the fine powder and the binder homogeneously mixed therein is deaerated under a vacuum, adjusted to a viscosity in the range of 20 to 100 poises, preferably 40 to 80 poises, applied in the form of sheet on a carrier film with a doctor blade having a fixed gap, and subsequently heated and dried continuously at a fixed temperature in the range of $40°$ to $150°$ C., such as $50°$ C., $80°$ C., or $120°$ C. to produce a ceramic green sheet. The carrier film as the substrate is a polymer substrate such as, for example, polyethylene terephthalate, polyethylene, polypropylene, polyamide, or polycarbonate. After peeling the green sheet off from the substrate, the ceramic sheet is obtained by calcining the green sheet.

Desirably, the thickness of the ceramic green sheet is approximately in the range of 0.01 to 1 mm, preferably 0.05 to 0.5 mm, and particularly desirably 30 to 300 microns.

The ceramic green sheet obtained by this invention may be calcined in its unmodified form to produce a flat ceramic sheet. When this ceramic green sheet is formed in the shape of a tray, a dish, a funnel, a cup, or a crucible, for example, and then calcined, there is obtained a ceramic article formed in the relevant shape. The ceramic article can be obtained in any other shape so long as the shape is attainable mechanically or manually. When the green sheet happens to have opposed ends to be joined during the course of the formation, the union thereof may be advantageously attained with the copolymer used as the binder in this invention. Other agents available for the union include carboxymethyl cellulose, ethyl cellulose, polyvinyl alcohol, phthalic ester such as dibutyl phthalate and dioctyl phthalate. The union of such two opposed ends is specifically attained by applying such an adhesive agent as mentioned above to the opposed ends of the green sheet and abutting the coated opposed ends against each other.

The green sheet obtained as described above possesses uniform thickness as well as sufficient strength and flexibility and excels in surface slipperiness. A ceramic sheet of a desired shape or a formed ceramic article can be obtained by calcining a green sheet in a flat state or a formed state by the conventional method. The calcination can be attained by defatting the green sheet at a temperature in the range of $200°$ to $500°$ C., preferably $250°$ to $450°$ C., and subsequently heating the defatted green sheet at a temperature in the range of $1,200°$ to $1,700°$ C., preferably $1,300°$ to $1,500°$ C. The atmosphere in the defatting oven and that in the calcination oven are not critical. Generally the defattng and the calcination can be carried out in the open air. Since the ceramic sheet obtained by the calcination treatment possesses very high surface slipperiness, it can be utilized as a sliding part.

Now, the present invention will be described more specifically below with refrence to and working examples. It should be noted, however, that this invention is not restricted to these examples. The parts and percentages mentioned in the working examples refer respectively to parts by weight and percents by weight unless otherwise specified. The molecular weights mentioned therein are invariably means as number average molecular weights.

EXAMPLE 1

In a separable flask provided with a stirrer, a thermometer, a condenser, a nitrogen inlet tube, a mixed monomer droping funnel, and a polymerization initiator dropping funnel, 120 parts of toluene was placed as a solvent and nitrogen was introduced through the nitrogen inlet tube until complete displacement of the air entrapped in the interior of the flask. Then, the mixed monomer droping funnel was charged with 100 parts of a mixed monomer containing 35% of n-butyl acrylate, 45% of n-butyl methacrylate, 2% of acrylic acid, and 18% of 2-hydroxyethyl acrylate and the polymerization initiator dropping funnel was charged with 0.4 part of azobisisobityronitrile. With the inner temperature of the flask regulated to $60°$ C., the mixed monomer and the polymerization initiator were added dropwise while under agitation into the flask over a period of two hours. Then, the mixture in the flask was heated at 80° C. for two hours and cooled, to produce a binder having a solid content of 45%, a molecular weight of 35,000, and a glass transition point of -16° C.

EXAMPLE 2

A binder having a solid content of 45%, a molecular weight of 75,000, and a glass transition point of −30° C. was obtained by following the procedure of Example 1, except that a mixed monomer containing 40% of ethyl acrylate, 10% of methyl methacrylate, 43% of lauryl methacrylate 4% of acrylic acid, and 3% of 2-hydroxyethyl acrylate was used instead.

EXAMPLE 3

A binder having a solid content of 40%, a molecular weight of 95,000 and a glass transition point of −7° C was obtained by following the procedure of Example 1, except that a monomer mixture containing 28% of 2-ethylhexyl acrylate, 67% of n-butyl acrylate, and 5% of methacrylic acid was used instead.

EXAMPLE 4

A binder having a solid content of 40%, a molecular weight of 50,000, and a glass transition point of −25° C. was obtained by following the procedure of Example 1, except that a mixed monomer containing 23.5% of 2-ethylhexyl acrylate, 75% of 2-ethylhexyl methacrylate, and 1.5% of methacrylic acid was used instead.

EXAMPLE 5

A binder having a solid content of 40%, a molecular weight of 30,000, and a glass transition point of −2° C. was obtained by following the procedure of Example 1, except that a mixed monomer containing 25% of n-butyl acrylate, 20% of isobutyl acrylate, 30% of n-butyl methacrylate, 24% of cyclohexyl methacrylate, and 1% of acrylic acid was used instead.

EXAMPLE 6

In 10 liters of toluene, 230 g of a surfactant made of sorbitan fatty acid ester and having HLB 8.6 was dissolved. The solution was kept stirred vigorously in a homogenizer and 6 liters of a mixed sol containing yttria sol and zirconia sol was added to the stirred solution. This mixed sol was prepared in such a manner that $Y_2O_3$ was contained in a concentration of 3 mol% in $ZrO_2$. Thus, the sol concentration was 3% by weight as $ZrO_2$. After the addition of the mixed sol, the solution was further stirred for about one hour to produce a W/O type sol emulsion. Then, the W/O sol emulsion was kept stirred and 100% ammonia gas was blown into the stirred solution at a flow rate of 200 m ml/min. for about two hours to effect gelation of the sol emulsion. The emulsion was heated to be deprived of the water azeotropically. The very small spherical particles consequently obtained in the emulsion were separated by filtration, washed with 1 liter of methanol, dried at 150° C. for 30 minutes, and subsequently calcined at 800° C. for two hours, to produce very small spherical particles of tetragonal zirconia having an average diameter of 0.5 micron and a $Y_2O_3$ content of 3 mol%. The standard deviation of the average particle diameter was 1.24.

EXAMPLE 7

A mixed aqueous solution of yttrium chloride and zirconium oxychloride was prepared so as to contain 8 mol% of $Y_2O_3$. The concentration of this solution was 0.2 mol/liter as $ZrO_2$. In a column type reactor provided with a stirrer, 1.2 liters of water was placed and adjusted to pH 8.5 by addition of aqua ammonia. To the water, the mixed aqueous solution mentioned above was added at a flow rate of 200 ml per minute and aqua ammonia (aqueous 28 wt% solution) was added at a rate of 200 ml per hour while under agitation with a metering pump. The neutralization and coprecipitation reaction which ensued was continued, with the reaction solution carried out with another metering pump so that the amount of liquid in the reactor would remain constant. During the course of the neutralization and coprecipitation reaction, the flow rates of the mixed aqueous solution and the aqua ammonia were finely adjusted so that the pH value of the liquid in the reactor would remain in the range of 8.5±0.2. The hydroxide in the mother liquid being carried out of the reactor was separated from the mother liquid by filtration and then washed with water for removal of ammonium chloride.

The hydroxide thus obtained was dispersed in n-butanol. The resultant dispersion was distilled under normal pressure at 105° C. to effect dehydration. The n-butanol dispersion containing the dehydrated oxide obtained by the distilation was spray dried, to produce a powder of high flowability. By calcining this powder at 950° C. for one hour, there was obtained a fine zirconia powder containing 8 mol% of yttria and containing no discernible cohering cluster. This fine powder had an average particle diameter of 0.05 micron.

EXAMPLE 8

A mixed aqueous solution of yttrium chloride and zirconium oxychloride containing 3 mol% of $Y_2O_3$ was prepared. The liquid solution was 0.2 mol/liter as $ZrO_2$. In a column type reactor provided with a stirrer, 1.2 liters of water was placed and adjusted to pH 8.5 by addition of aqua ammonia. To the water, the mixed aqueous solution mentioned above was added at a flow rate of 200 ml per minute and aqua ammonia (aqueous 28wt% solution) was added at a flow rate of 200 ml per hour with a metering pump while under agitation. The neutralization and coprecipitation reaction which ensued was continued, with the reaction solution carried out with another metering pump so that the amount of liquid in the reactor would remain constant. The neutralization and coprecipitation reaction was carried out, with the flow rates of the mixed aqueous solution and the aqua ammonia finely adjusted so that the pH value would remain in the range of 8.5±0.2 throughout the entire course of the reaction. The hydroxide in the mother liquid being carried out from the reactor was separated from the mother liquid by filtration and then washed with water for removal of ammonium chloride.

The washing treatment which consisted of dispersing the hydroxide by stirring in an aqueous solution adjusted in advance to pH 9 with ammonia, removing the residual chlorine from the hydroxide, and separating the hydroxide through filtration from the mother liquid was repeated until the chlorine content in the filtrate fell below 1 ppm.

Then, the washed hydroxide was dispersed in 1-propanol. The resultant dispersion was heated under a vacuum to effect removal of the water content from the hydroxide in the form of an azeotrope with 1-propanol. The hydroxide which consequently remained was dried and then calcined at 850° C. for one hour, to produce a fine powder. In a ball mill of resin, the fine powder was dispersed with water and then spray dried, to produce a fine zirconia powder containing 3 mol% of yttria and containing no discernible coherent cluster. This fine powder had an average particle diameter of 0.03 micron.

EXAMPLE 9

In 1 liter of toluene, 10 g of a surfactant made of sorbitan fatty acid ester was dissolved. The solution was kept vigorously stirred. The solution and 0.8 liter of alumina sol of a concentration of 8% by weight added thereto were stirred for one hour to prepare a W/O type sol emulsion. Then, this W/O type sol emulsion was kept stirred and 10% ammonia gas was blown into the stirred emulsion at a flow rate of 20 ml/min. for about two hours, to effect gelation of the sol emulsion. The gel emulsion was then heated for azeotropic removal of the water content. The very small spherical particles consequently obtained were dried at 150° C. for 30 minutes and then calcined at 400° C. for two hours, to produce very small spherical particles of alumina having an average particle diameter of 1 micron. The standard deviation of this average particle diameter was 1.3.

EXAMPLE 10

An aqueous alumina nitrate solution was prepared so as to have a solution concentration of 0.3 mol/liter as $Al_2O_3$. In a column type reactor provided with a stirrer, 1.2 liters of water was placed and adjusted to pH 9 by addition of aqua ammonia. To this water, the aqueous solution mentioned above was added at a rate of 200 ml per minute and aqua ammonia (aqueous 28 wt% solution) was added at a rate of 300 ml per hour with a metering pump while undr agitation. The neutralization reaction which ensued was continued, with the reaction solution carried out with another metering pump in such a manner that the amount of the liquid in the reactor would remain constant. The neutralization was continued, with the flow rate of the aqueous solution and that of the aqua ammonia finely adjusted so that the pH value would remain within the range of $9 \pm 0.2$ throughout the entire course of the reaction. The hydroxide in the mother liquid being carried out of the reactor was separated by filtration from the mother liquid and then washed with water to effect removal of ammonium nitrate.

The washing treatment which consisted of dispersing the hydroxide by stirring in an aqueous solution adjusted in advance to pH 9 with ammonia, removing the residual $NO_3^-$ ion from the hydroxide, and separating the hydroxide through filtration from the mother liquid was repeated until the $NO_3-$ ion fell below 1 ppm.

Then, the hydroxide which had undergone the washing treatment was dispersed in 1-propanol. The resultant dispersion was heated under a vacuum to effect azeotropic expulsion of the water content of the hydroxide with 1-propanol from the system. The remaining hydroxide was dried and then calcined at 1,100° C. for one hour.

In a ball mill of alumina, the fine powder consequently obtained was dispersed in water. The resultant dispersion was spray dried, to produce a fine alumina powder containing no discernible coherent cluster. The average particle diameter of this fine powder was 0.1 micron.

EXAMPLE 11

In a ball mill, 100 parts of very small spherical particles of tetragonal zirconia having an average particle diameter of 0.5 micron and a yttria content of 3 mol% and obtained in Example 6, 30 parts of toluene, 40 parts of ethyl acetate, and 1.5 parts of sorbitan fatty acid ester (produced by Sanyo Kasei Kogyo K.K. and marketed under trademark designation of "Ionet S-80") as a dispersant were kneaded for two hours. The resultant mixture and 25 parts of the binder obtained in Example 1 and 1 part of dioctyl phthalate as a plasticizer added thereto were kneaded for 22 hours to produce a slurry.

This slurry was filtered through a metal gauze of 200 mesh, stirred at a rate of 40 rpm to be aged, then deaerated under a vacuum, adjusted to a viscosity of 60 poises, then applied on a polyethylene terephthalate film with the aid of a doctor blade, and heated sequentially at 50° C., 80° C., and 120° C., to produce a green sheet of zirconia 40 microns in thickness.

EXAMPLE 12

A green sheet of zirconia having a thickness of 30 microns was obtained by following the procedure of Example 11, except that 100 parts of very fine particles of cubic zirconia containing 8 mol% of yttria of a particle diameter of 0.05 microns and obtained in Example 7 and 35 parts of the binder obtained in Example 2 were used instead.

EXAMPLE 13

A green sheet of zirconia 300 microns in thickness was obtained by following the procedure of Example 11, except that 100 parts of very small spherical particles of tetragonal zirconia having an average particle diameter of 2 microns and containing 3 mol% of yttria and obtained in the same manner as in Example 6, 15 parts of the binder obtained in Example 5, and 3 parts of dibutyl phthalate as a plasticizer were used instead.

EXAMPLE 14

A green sheet of zirconia 20 microns in thickness was obtained by following the procedure of Example 11, except that 100 parts of very small particles of tetragonal zirconia having an average particle diameter of 0.03 micron and containing 3 mol% of yttria and obtained in Example 8 and 40 parts of the binder obtained in Example 3 were used instead.

EXAMPLE 15

A green sheet of alumina 80 microns in thickness was obtained by following the procedure of Example 11, except that 100 parts of very spherical small particles of alumina having an average particle diameter of 1 micron and obtained in Example 9 and 15 parts of the binder obtained in Example 1 were used instead.

EXAMPLE 16

A green sheet of alumina 50 mirons in thickness was obtained by following the procedure of Example 11, except that 98 parts of very small particles of alumina having an average particle diameter of 0.1 micron and obtained in Example 10 and 30 parts of the binder obtained in Example 2 and 2 parts of a glass slit as a sintering aid was used instead.

EXAMPLE 17

A green sheet of zirconia-alumina having a thickness of 75 microns was obtained by following the procedure of Example 11, except that 97 parts of very small spherical particles of tetragonal zirconia having an average particle diameter of 0.5 micron and containing 3 mol% of yttria and obtained in Example 6, 3 parts of a fine powder of alumina having an average particle diameter of 0.1 micron obtained in Example 10, and 20 parts of the binder obtained in Example 4 were added instead.

Control 1

In a ball mill, 100 parts of very small spherical particles of zirconia containing 3 mol% of yttria having an average particle diameter of 0.5 micron and obtained in Example 6, 35 parts of ethyl alcohol, 35 parts of methylethyl ketone, and 1.5 parts of glyceryl trioleate as a dispersant were kneaded for two hours. The resultant mixture and 30 parts of polyvinyl butyral (produced by Denkikagaku Kogyo K.K. and marketed under product code of "3000K") and 3 parts of dioctyl phthalate added thereto were kneaded for 22 hours, to produce a slurry.

Then, by following the procedure of Example 11, the resultant slurry was adjusted to 50 poises and applied on a carrier film with a doctor blade, to produce a green sheet of zirconia 40 microns in thickness.

EXAMPLE 18

The zirconia green sheets, alumina green sheets, and zirconia-alumina green sheets obtained in Examples 9 to 17 and Control 1 were tested for raw density. Then, they were stretched with a dumbbell No. 3 (JIS K6301) at a perforating tensile speed of 1 cm/min. and tested for elongation and strength at rupture. To test for flexibility and break resistance, the green sheets were wound on glass rod 10 mm in diameter and then folded and, after the infliction of the impacts, were visually examined as to the surface conditions.

The results are shown in Table 1.

50-mm square. Their surface conditions were observed visually.

The results are shown in Table 2.

TABLE 2

|  | Density, g/cm³ | Surface roughness (Ra), micron | Amount of warp, mm | Surface condition |
|---|---|---|---|---|
| EX. 11 | 5.92 | 0.07 | 0.009 | Good |
| 12 | 5.71 | 0.28 | 0.011 | " |
| 13 | 5.94 | 0.10 | 0.023 | " |
| 14 | 5.69 | 0.18 | 0.018 | " |
| 15 | 3.90 | 0.09 | 0.014 | " |
| 16 | 3.84 | " | 0.007 | " |
| 17 | 5.66 | 0.06 | 0.010 | " |
| Control 1 | 5.78 | — | — | Crack sustained |

EXAMPLE 19

In a ball mill, 100 parts of the very small particles of tetragonal zirconia obtained in Example 6, 30 parts of toluene, 40 parts of ethyl acetate, and 1.5 parts of sorbitan fatty acid ester (produced by Sanyo Kasei Kogyo K.K., and marketed under trademark designation of "Ionet S-80") as a dispersant were kneaded for two hours. The resultant mixture and 20 parts of the copolymer obtained in Example 1 and 1 part of dioctyl phthalate as a plasticizer added thereto were kneaded for 22 hours, to produce a slurry. This slurry was passed through a 200-mesh metal gauze, stirred at a rate of 40 rpm for necessary aging, deaerated under a vacuum to adjust the viscosity to 60 poises, sequentially heated at 50° C., 80° C., and 120° C., then, applied on a polyethylene terephthalate film with the aid of a doctor blade to produce zirconia green sheets 200 microns and 400 microns in thickness.

From each of the zirconia green sheets 200 microns in thickness, a box 5 cm in height, 15 cm in length, and 15 cm in width was produced manually by cutting squares of a fixed side (equalling the height mentioned above) one each at the four corners of sheet and raising upright

TABLE 1

| Green sheet | | Physical properties of green sheet | | | | | |
|---|---|---|---|---|---|---|---|
|  | Composition | Thickness (micron) | Raw density, g/cm³ | Bending strength kg/cm² | Elongation | Flexibility | Resistance to folding |
| Ex. 11 | Zirconia containing 3 mol % of Y₂O₃ | 40 | 2.74 | 42.9 | 8.4 | Good | Good |
| Ex. 12 | Zirconia containing 8 mol % of Y₂O₃ | 30 | 2.65 | 48.5 | 16.2 | " | " |
| Ex. 13 | Zirconia containing 3 mol % of Y₂O₃ | 300 | 2.80 | 53.8 | 10.4 | " | " |
| Ex. 14 | Zirconia containing 3 mol % of Y₂O₃ | 20 | 2.59 | 40.4 | 21.9 | " | " |
| Ex. 15 | Alumina | 80 | 2.48 | 40.1 | 7.3 | " | " |
| Ex. 16 | Alumina containing 2% of glass slit | 50 | 2.35 | 32.8 | 12.5 | " | " |
| Ex. 17 | 97% of zirconia containing 3 mol % of Y₂O₃ and 3% of alumina | 75 | 2.75 | 45.4 | 11.2 | " | " |
| Control 1 | Zirconia containing 3 mol % of Y₂O₃ | 40 | 2.70 | 14.7 | 1.9 | Cracks sustained | Breakage sustained |

Then, the zirconia green sheets obtained in Examples 11 to 14 and 17 and Control 1 were calcined at 1,450° C. and the alumina green sheets obtained in Examples 15 and 16 were calcined at 1,650° C., to produce ceramic sheets. These sheets were evaluated with respect to density, surface roughness, maximum depth of curved surface (amount of warp) as reduced to the size of the four flaps remaining after the removal of the squares. The opposed ends of the flaps were joined by applying with a brush to the joints the binder prepared by diluting the copolymer obtained in Example 1 with toluene to a solid concentration of 15%. The box-shaped green sheet was placed on a layer of fine zirconia powder covering the inside bottom of a pot, enclosed therein with a stopper securd in the opening of the pot, placed in a defatting furnace, heated therein up to 500° C. at a temperature increasing rate of 0.5° C./min. between 250° and 500° C., and retained at 500° C. for two hours. Then, the defatted box-shaped sheet was placed in an electric furnance, heated therein up to 1,400° C. at a temperature increasing rate of 1° C./min. between 1,000° to 1,400° C., and retained at 1,400° C. for two hours. Consequently, a zirconia box perfectly free from crack and fructure was obtained.

EXAMPLE 20

A tray-shaped green sheet was obtained by inserting a zirconia green sheet 400 microns in thickness obtained in Example 19 in a press using a projected surface and a depressed surface in a matched pattern and thermally compressing the green sheet under a pressure of 10 kg/cm²·f at a temperature of 100° C. By defatting and calcining the tray-shaped green sheet in the same manner as in Example 19, there was obtained a zirconia tray perfectly free from crack and fructure.

EXAMPLE 21

A crucible-shaped green sheet was obtained by allowing a zirconia green sheet 200 microns in thickness obtained in Example 19 to drape the inner surface of a ceramic crucible and pressing the green sheet uniformly against the inner surface with an agate pestle. By defatting and calcining this crucible-shaped green sheet in the same manner as in Example 19, there was obtained a zorconia crucible perfectrly free from crack and fructure.

Control 2

A zirconia green sheet was obtained by following the procedure of Example 19, except that 20 parts of polyvinyl butyral resin was used in place of 20 parts of the acryl type copolymer. When a box was produced from the green sheet by following the procedure of Example 19, it sustained cracks in the bent portions.

What is claimed is:

1. A ceramic green sheet made of a sheet of a ceramic precursor composition comprising
   (A) 100 parts by weight of at least one fine ceramic powder selected from the group consisting of zirconia and alumina and having an average particle diameter in the range of 0.01 to 2 microns and
   (B) 10 to 40 parts by weight of a copolymer produced by copolymerizing
      (a) 10 to 50% by weight of an alkyl or cycloalkyl acrylate having an alkyl group of 1 to 10 carbon atoms or a cycloalkyl group of 4 to 8 carbon atoms,
      (b) 30 to 80% by weight of an alkyl or cycloalkyl methacrylate having an alkyl group of 1 to 20 carbon atoms or a cycloalkyl group of 4 to 8 carbon atoms,
      (c) 1 to 5% by weight of a copolymerizable unsaturated carboxyl , and
      (d) 3 to 59% by weight of a hydroxyalkyl acrylate having a hydroxyalkyl group of 2 to 10 carbon atoms (providing that the total amount of the monomers is 100% by weight)
   and having a number average molecular weight in the range of 10,000 to 100,000 and a glass transition point in the range of −40° to 0° C.

2. A ceramic green sheet according to claim 1, wherein said fine ceramic powder comprises minute spherical particles.

3. A ceramic green sheet according to claim 1, wherein (a) said alkyl or cycloalkyl acrylate has an alkyl group of 2 to 8 carbon atoms or a cycloalkyl group of 5 to 6 carbon atoms, (b) said alkyl or cycloalkyl methacrylate has an alkyl group of 2 to 8 carbon atoms or a cycloalkyl group of 5 to 6 carbon atoms, (c) said copolymerizable carboxylic acid is acrylic acid or methacrylic acid, and (d) said hydroxyalkyl acrylate has a hydroxyalkyl group of 2 to 4 cabon atoms.

4. A ceramic green sheet according to claim 3, wherein (B) said copolymer has a number average molecular weight in the range of 30.,000 to 75,000 and a glass transition point in the range of −30° to −10° C.

5. A ceramic green sheet according to claim 1, wherein the standard deviation of said average particle diameter of said fine ceramic powder is in the range of 1 to 1.5.

6. A ceramic green sheet according to claim 1, wherein the amount of said copolymer to be incorporated is in the range of 15 to 30 parts by weight, based on 100 parts by weight of said fine ceramic powder.

7. A ceramic green sheet according to claim 1, wherein said sheet has a thickness in the range of 0.01 to 1 mm.

8. A ceramic sheet, produced by calcining a ceramic green sheet made of a sheet of a ceramic precursor composition, comprising
   (A) 100 parts by weight of at least one fine ceramic powder selected from the group consisting of zirconia and alumina and having an average particle diameter in the range of 0.01 to 2 microns and
   (B) 10 to 40 parts by weight of a copolymer produced by copolymerizing
      (a) 10 to 50% by weight of an alkyl or cycloalkyl acrylate having an alkyl group of 1 to 10 carbon atoms or a cycloalkyl group of 4 to 8 carbon atoms,
      (b) 30 to 80% by weight of an alkyl or cycloalkyl methacrylate having alkyl group of 1 to 10 carbon atoms or a cycloalkyl group of 4 to 8 carbon atoms,
      (c) 1 to 5% by weight of a copolymerizable unsaturated carboxylic acid, and
      (d) 3 to 59% by weight of a hydroxyalkyl acrylate having a hydroxyalkyl group of 2 to 10 carbon atoms (providing that the total amount of the monomers is 100% by weight) and having a number average molecular weight in the range of 10,000 to 100,000 and a glass transition point in the range of −40° to 0° C.

9. A ceramic sheet according to claim 8, wherein said fine ceramic powder comprises minute spherical particles.

10. A ceramic sheet according to claim 8, wherein (a) said alkyl or cycloalkyl acrylate has an alkyl group of 2 to carbon atoms or a cycloalkyl group of 5 to 6 carbon atoms, (b) said alkyl or cycloalkyl methacrylate has an alkyl group of 2 to 8 carbon atoms or a cycloalkyl group of 5 to 6 carbon atoms, (c) said copolymerizable carboxylic acid is acrylic acid or methacrylic acid, and (d) said hydroxyalkyl acrylate has a hydroxyalkyl group of 2 to 4 carbon atoms.

11. A ceramic sheet according to claim 10, wherein (B) said copolymer has a number average molecular weight in the range of 30,000 to 75,000 and a glass transition point in the range of −30° to −10° C.

12. A ceramic sheet according to claim 8, wherein the standard deviation of said average particle diameter of said fine ceramic powder is in the range of 1 to 1.5.

13. A ceramic sheet according to claim 8, wherein the amount of said copolymer to be incorporated is in the range of 15 to 30 parts by weight, based on 100 parts by weight of said fine ceramic powder.

14. A ceramic sheet according to claim 8, wherein said sheet has a thickness in the range of 0.01 to 1 mm.

* * * * *